United States Patent
King et al.

(10) Patent No.: US 7,357,547 B2
(45) Date of Patent: Apr. 15, 2008

(54) SHEAR WELDED MOUNTING STUD ASSEMBLY

(75) Inventors: Troy King, Pendleton, IN (US); Michael W. Beeler, Anderson, IN (US); Jack D. Bodem, Kokomo, IN (US); Edwin R. Drews, Anderson, IN (US)

(73) Assignee: GM Global Technology Operations, Inc., Detroit, MI (US)

( * ) Notice: Subject to any disclaimer, the term of this patent is extended or adjusted under 35 U.S.C. 154(b) by 37 days.

(21) Appl. No.: 10/965,358

(22) Filed: Oct. 13, 2004

(65) Prior Publication Data

US 2006/0077682 A1 Apr. 13, 2006

(51) Int. Cl.
*F21V 7/04* (2006.01)

(52) U.S. Cl. .................. 362/549; 362/459; 362/546; 362/365; 362/368; 362/370

(58) Field of Classification Search ........... 362/368, 362/365, 549, 459, 507, 546, 362, 370, 578, 362/515
See application file for complete search history.

(56) References Cited

U.S. PATENT DOCUMENTS

| | | | |
|---|---|---|---|
| 3,666,940 A | 5/1972 | Magi | |
| 4,347,556 A | 8/1982 | Malm | |
| 4,974,123 A * | 11/1990 | Luallin et al. | 362/549 |
| 5,154,505 A * | 10/1992 | Sasamoto | 362/549 |
| 5,934,786 A * | 8/1999 | O'Keefe | 362/147 |
| 6,124,886 A | 9/2000 | DeLine et al. | |
| 6,176,592 B1 | 1/2001 | Kovacik et al. | |
| 6,332,697 B2 * | 12/2001 | Soga et al. | 362/368 |
| 6,386,742 B1 | 5/2002 | DeLine et al. | |
| 6,474,855 B1 * | 11/2002 | Kluenker et al. | 362/523 |
| 6,672,744 B2 | 1/2004 | DeLine et al. | |
| 6,695,396 B1 * | 2/2004 | Schwab | 296/203.02 |
| 6,824,300 B2 * | 11/2004 | Drews et al. | 362/515 |
| 2001/0046135 A1 | 11/2001 | Soga et al. | |
| 2002/0191409 A1 | 12/2002 | Deline et al. | |
| 2003/0161156 A1 * | 8/2003 | Felty | 362/368 |
| 2003/0235057 A1 | 12/2003 | Drews et al. | |

FOREIGN PATENT DOCUMENTS

JP 01052539 A 2/1989

* cited by examiner

*Primary Examiner*—Jacob Y Choi (57) ABSTRACT

The subject invention relates to an assembly and method for attaching a stud to a lamp housing that decreases the overall size of the automotive lamp assembly. The apparatus has a collar molded over a stud. The collar attaches the stud to the lamp housing by being shear welded to the lamp housing. The stud is prevented from rotating about its longitudinal axis, so that it can serve to mount the lamp housing to an automobile.

12 Claims, 9 Drawing Sheets

SHEAR WELDED MOUNTING STUD ASSEMBLY

BACKGROUND OF THE INVENTION

In order for an automotive lighting assembly to be mounted in an automobile, the lighting assembly must fit within a small defined space that is specifically designed for that automobile's automotive lighting assembly. Consequently, the automotive lighting assembly must be as compact as possible. Automotive lamp housings typically have several studs attached to their exterior or interior for use in mounting the lamp housing on an automobile. Sometimes the studs are threaded to allow fine adjustment or positioning of the lamp housing to control the direction of the light beam, while other studs may be relatively smooth to fit into a corresponding slot for alignment. Regardless of the nature or use of the stud, the stud must be attached to the lamp housing with sufficient strength in order to allow the lamp housing to attach to a corresponding anchor on an automobile.

Figure 1:
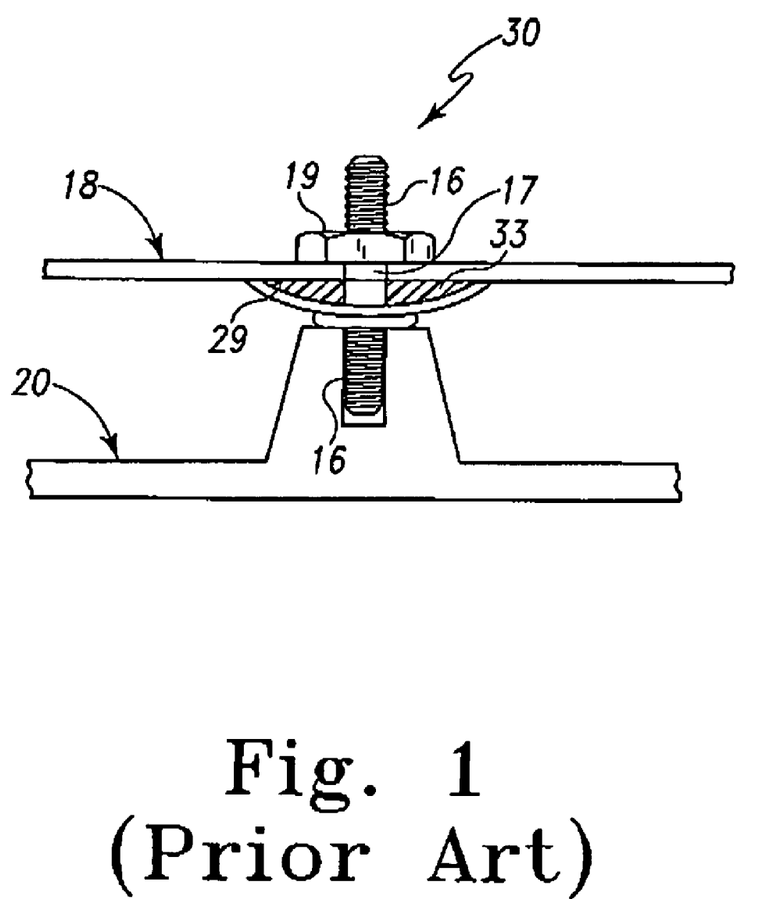
FIG. 1 shows a cross-section of one common assembly for connecting a lamp assembly to a mounting panel of an automobile.

One common method and assembly for connecting a stud to a lamp assembly is shown in FIG. 1. As shown in FIG. 1, a double-sided stud 30 with two threaded portions 16 is mated with an integrally molded plastic mounting boss 28 of a lamp housing 20 by inserting one of the threaded portions 16 into the mounting boss. Lamp housing 20 is molded with bosses 28 by means known to those skilled in the art. After stud 30 is inserted into boss 28 and prior to mounting the lamp housing to a mounting panel 18, a plate 29 is attached to stud 30 by means well known in the art. A foam gasket 33 is then attached to stud 30 so that it sits adjacent to the backside of plate 29. The lamp housing 20 is then attached to the mounting panel 18 of an automobile by inserting the threaded portion 16 opposite the lamp housing through an opening 17 that passes through the mounting panel. Once inserted, foam gasket 33 is pinched between plate 29 and mounting panel 18 in order to seal opening 17 and a nut 19 is tightened on the stud to attach the lamp housing to the mounting panel. Boss 28 of lamp housing 20 will sit against the plate 29 once the lamp housing 20 is connected to the mounting panel. Unfortunately, a double-sided stud mated with an integrally molded boss limits the design flexibility of a manufacturer and prevents a manufacturer from being able to further reduce the size of the total lamp assembly, because the boss needs to be of sufficient size to allow the stud to mate with the lamp housing without effecting the internal workings of the lighting assembly.

Aside from limiting design options, the double-sided stud and integral molded mounting boss assembly leads to other problems. For example, manufacturing lamp housings to include integrally molded bosses complicate the designs of molds and the molding process. Complicated molds not only increase costs, but also increase the possibility of mold failure during the manufacturing process.

Further, referring to FIG. 1, the plate 29 leads to a lot of variation between the connections of the lamp housing designed for a particular line of automobiles. On the manufacturing line, each automobile design has a plurality of lamp assemblies specifically designed to fit into lighting compartments on the automobile. Thus, lighting manufacturers design and make several of the same lamp assembly for each of these compartments in order to allow the manufacturing of a particular line of automobiles. Unfortunately, even though the automobiles are made the same and the lamp assemblies are made the same, there are sources of variations that cause each of a particular lamp assembly to fit differently in each of the particular compartments of a line of automobiles. Such variations lead to gaps in between the automobile's lighting compartment and the lighting assembly. Manufacturers spend a lot of time, energy and cost eliminating these gaps by placing seals around the lighting assemblies in order to, have an aesthetically pleasing automobile.

Referring back to FIG. 1, the plate 29 causes variation in the lamp assembly connection between the automobile and lamp assembly, because the plate will not be of the same size or of the same depth, even though the plates are made from the same process. Thus, each lamp assembly will be sitting on plates 29 that vary in depth and size. It is accepted and general manufacturing error that leads to this variation and leads to gaps between the lamp housing and automobile. However, it is desired to eliminate or at least decrease the variation from automobile to automobile in order to save money and time during manufacturing of the automobile.

Figure 2A:
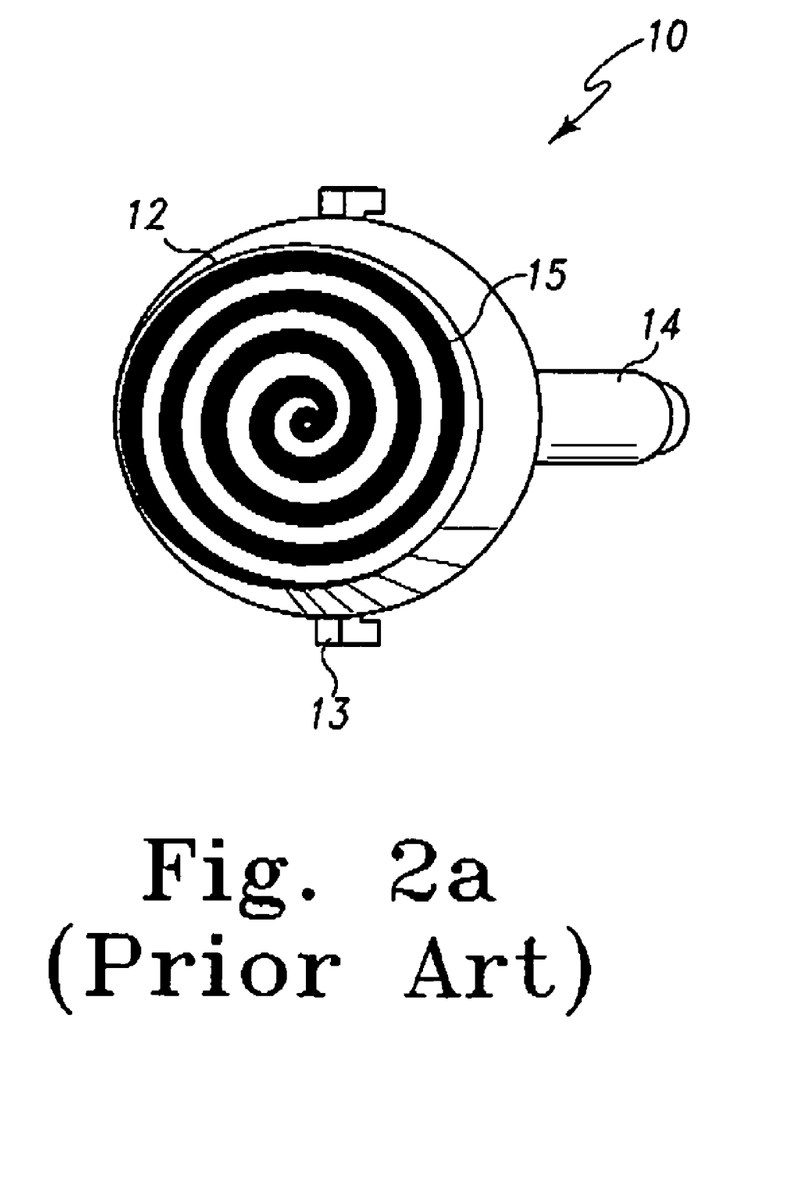
FIG. 2a shows a side view of one known embodiment of a stud 10 that can be spin welded to a lamp housing.

To get around some of the problems associated with the two-sided stud and integrally molded boss connection, designers have searched for alternate ways to mount the stud to the lamp housing. One such method involves spin welding a single-sided stud to the lamp housing. FIG. 2a shows a perspective view of one known embodiment of a stud 10 that can be spin welded to a lamp housing (shown in FIGS. 3a and 3b). As shown in FIG. 2a, stud 10 is a molded plastic stud that has a cap 12 and a post 14. Cap 12 has a relatively flat surface with spiral ridges 15 and has ears 13 positioned thereon. In operation, a pneumatic tool (not pictured) fits onto the ears 13. Cap 12 is placed on the surface it is to be welded too, such as lamp housing 20, and then spun by the tool. As stud 10 spins the spiral ridges 15 create friction and heat between plastic cap 12 and a corresponding plastic lamp housing 20 until the cap and lamp housing are melted and ultimately welded together. Ears 13 will break away when the ideal melt point is reached and will prevent any further rotation of stud 10 by the tool. Stud 10 is then held against lamp housing 20 until the weld sets. Unfortunately, such an embodiment does not allow for a metal stud to be attached to a lamp housing, which ultimately leads to a weaker connection between the lamp housing and automobile.

Figure 2B:
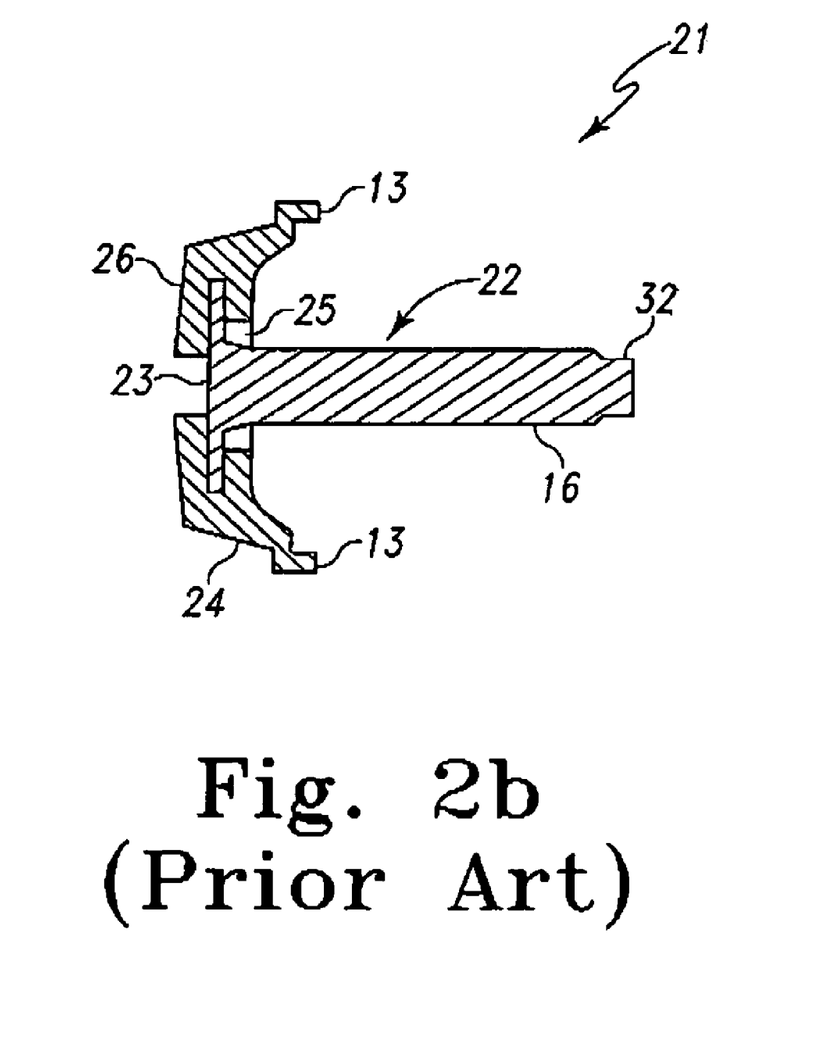
FIG. 2b shows a side view of another known embodiment of a stud assembly that can be spin welded to a lamp housing.
Figure 3A:
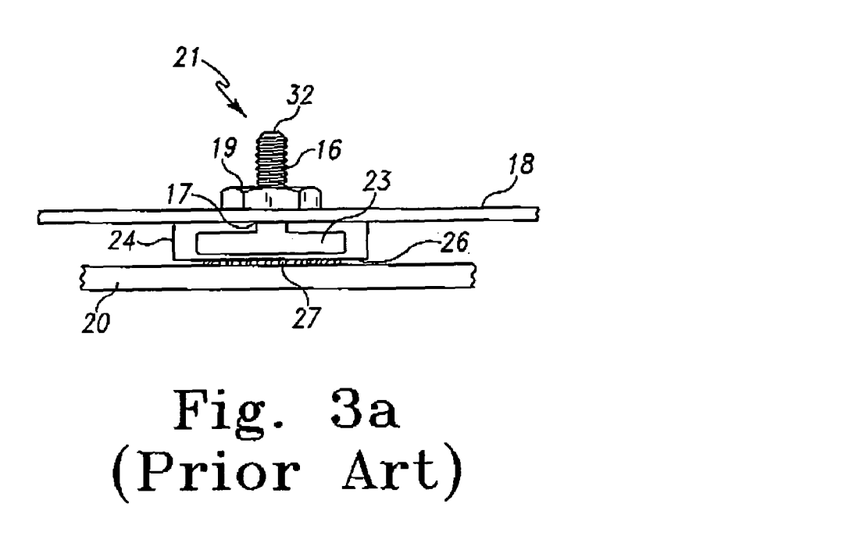
FIG. 3a shows a cross-section of the stud assembly of FIG. 2b connecting a thin lamp assembly to a mounting panel of an automobile.

To overcome this disadvantage, a stud assembly was created that joined a single-sided, metal stud with a plastic collar that cold be spin welded to a lamp housing. FIG. 2b shows a cross section view of a stud assembly 21 that comprises a metal stud 22 with a cap 23 and a post 32 with a threaded portion 16. As shown in FIG. 2b, stud assembly 21 further comprises a collar 24 that is molded over stud 22 so that cap 23 sits in a recess 25. Collar 24 has a face 26 and ears 13. Just as with stud 10, a pneumatic tool can be used to spin weld stud assembly 21 to a lamp housing 20 (shown in FIGS. 3a and 3b). The tool can connect to the ears 13 and spin face 26 against the lamp housing 20 until the lamp housing and stud assembly are welded together. Ears 13 will break away when the ideal melt point is reached, which will prevent any further rotation of stud assembly 21 by the tool. Stud assembly 21 is held against lamp housing 20 until the weld sets. FIG. 3a shows stud assembly 21 spin welded to a thin lamp housing 20 and mounted to mounting panel 18. As shown in FIG. 3a, face 26 is welded together with a section of lamp housing 20 at a weld interface section 27. Stud assembly's 21 threaded portion 16 is inserted through opening 17 on mounting panel 18 on the automobile and fastened to the panel by a nut 19.

The problem that plagues spin welded studs and/or stud assemblies is that during the welding process the cap and/or collar are usually driven into lamp housing to some degree. As the heat increase and pressure increases, the lamp housing melts which causes the stud and/or stud assembly to drive into the lamp housing. This causes variation in the amount of space that is in between the lamp housing and mounting panel (i.e. the depth of the collar that separates the lamp housing and panel varies depending on how far the collar is driven into the lamp housing). As discussed above, such variations cause gaps between the automobile and lamp assembly which must be plugged up for, among other reasons, aesthetic reasons. Such a process adds time and expense to the automotive assembly process.

Figure 3B:
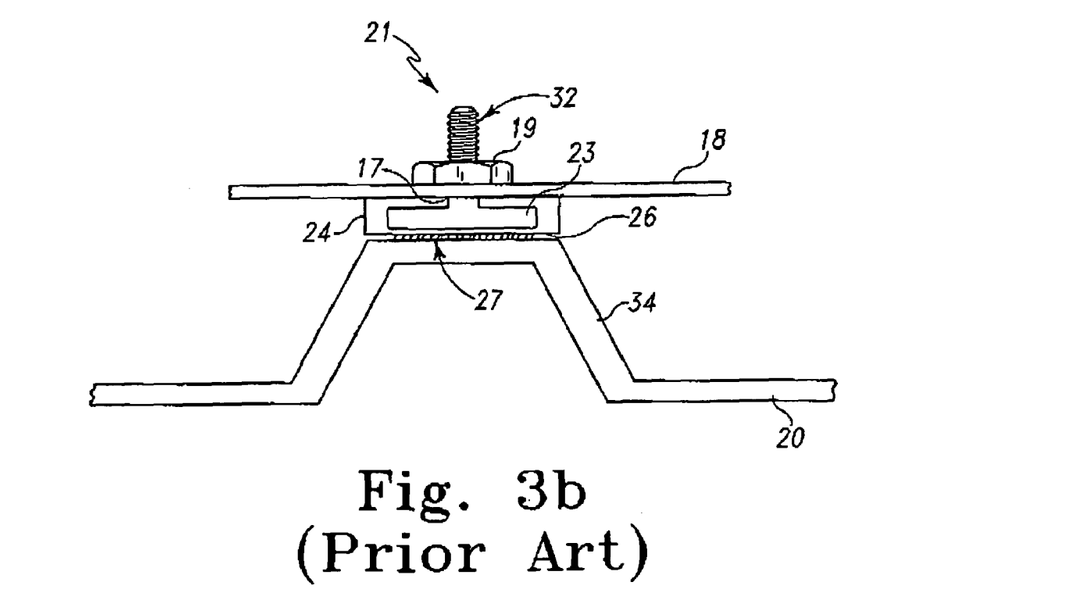
FIG. 3b shows a cross-section of the stud assembly of FIG. 2b connecting a normal sized lamp assembly to a mounting panel of an automobile.

A further draw back with spin welded stud assemblies is they can only easily and inexpensively be used with thin lamp assemblies that have a housing that will ultimately be in close proximity with the mounting panel (as shown in FIG. 3a). If used in normal lamp assemblies, the lamp assemblies would have to be molded with raised surfaces on the back of the lamp housing so that the stud would be able to be in close proximity and attached to the mounting panel. FIG. 3b shows stud assembly 21 welded to a normal lamp housing 20. As shown in FIG. 3b, lamp housing 20 has a raised area 34 that allows assembly 21 to be welded to the lamp housing and mounted to mounting panel 18. Like the double-sided stud and integrally molded boss connection, such raised surfaces lead to complicated mold designs and mold failure, which increases the cost of manufacturing lamp assemblies. Moreover, after installing lamp assemblies with spin welded studs and/or stud assemblies, it has been determined that the weld is inconsistent and ultimately, subject to failure.

Accordingly, what is needed is a method and assembly that increases design flexibility and allows a manufacturer to further decrease the size of the lamp assembly. Further, what is needed is a method and assembly for allowing a stud to be added to an automotive lamp housing that reduces the manufacturing costs and possibility of mold failures. More particularly, what is needed is a method and assembly that allows a stud assembly to be attached to any lamp assembly with a stronger, more consistent weld joint and a method and assembly that reduces variation and promotes a more accurate fit between the lamp housing and automobile. These and other advantages of the subject invention will be understood from the below description.

BRIEF SUMMARY OF THE INVENTION

The subject invention relates to an assembly and method of attaching a stud to any type of automotive lamp assembly. In one embodiment, the automotive lamp assembly comprises a lamp housing with a receiving surface and a metal stud. The metal stud has a cap and a post extending outwardly from the cap. The lamp assembly further comprises a over molded collar with a recess around the cap, a face that the cap seats below, an outer peripheral surface, and an opening through which the post extends. The collar is shear welded to the receiving surface of the lamp housing, so that the metal stud is attached to the lamp housing by the shear welded collar and the post extends outwardly from the lamp housing.

In one embodiment, the cap and the recess in the collar are shaped so that the cap is substantially prevented from rotating around its longitudinal axis when positioned within the collar. For example, the cap and the recess in the collar can both be oval in shape to prevent such rotation. Alternatively, the cap's outer peripheral edge can comprise a plurality of gear-like teeth and the collar's inner peripheral surface can comprise a corresponding plurality of gear-like teeth. These gear-like teeth can interact with one another to prevent the cap and stud from rotating about the stud's longitudinal axis.

The lamp housing and the collar should comprise the same shear weldable material to obtain the most effective weld between the collar and the lamp housing. For example, the shear weldable material can comprise any number of plastic polymers. The collar can be shear welded to the receiving surface of the lamp housing about the collar's outer peripheral surface. The receiving surface can comprises a raised rib on the lamp housing that forms a receiving recess for the collar. The top of the raised rib comprises an angled lead that helps guide the collar into the receiving recess. The stud can also have a threaded portion that allows the stud to be mounted to an anchor, such as a mounting panel, in an automobile.

The metal stud can be attached to the automotive lamp housing by a shear welding process. Such a method includes the step of over molding the collar around the cap so that a recess is formed around the cap and an opening is formed that allows the post to extend through the collar. One surface of the collar is shear welded to a surface on the automotive lamp housing so that the collar attaches the stud to the automotive lamp housing. The collar's surface that is welded to the lamp housing can be the collar's outer peripheral surface. The automotive lamp housing surface can comprise a receiving recess in which the collar is welded to the lamp housing. After the collar and stud are shear welded to the lamp housing, the stud can be mounted to an anchor positioned on an automobile.

BRIEF DESCRIPTION OF THE DRAWINGS

The advantages of the subject invention, the manner of obtaining them, and the invention itself will become more apparent and better understood by reference to the following description of the embodiments of the invention, taken in conjunction with the accompanying drawings, wherein:

FIG. 6 is a backside view of a section of the lamp housing that the stud collar assembly of FIG. 5 is attached to;

FIG. 9b is a perspective view of the assembled stud and collar assembly of FIG. 9a; and FIG. 9c is a rear perspective view of the stud and collar assembly of FIG. 9a.

Corresponding reference characters in the Figures indicate corresponding parts throughout the Figures.

DETAILED DESCRIPTION OF THE INVENTION

Figure 4:
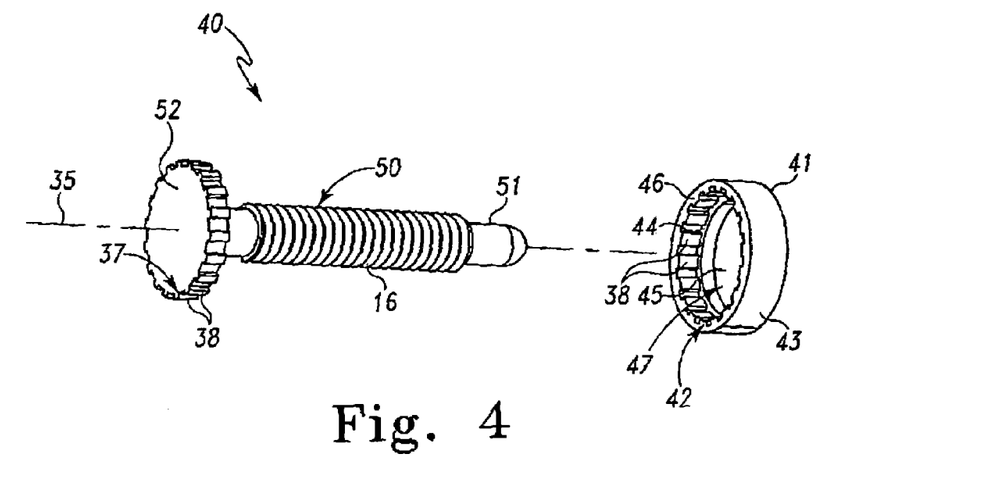
FIG. 4 is an exploded view of a stud and collar assembly according to one embodiment of the subject invention.

The subject invention relates to automotive lamp assemblies. More specifically, the subject invention relates to an assembly and method for attaching a stud to an automotive lamp housing. FIG. 4 shows an exploded perspective view of one embodiment of a stud and collar assembly 40 that serves to attach a one-sided stud 50 to an automotive lamp assembly 20 (shown in FIG. 7). As shown in FIG. 4, stud 50 is a single piece of metal having a post 51 with threaded portion 16 and a circular cap portion 52. Stud 50 may comprise any type of metal or alloy capable of being machined or cast, including but not limited to steel, aluminum, and zinc. While post 51 does not require threaded portion 16 in all embodiments, threaded portion 16 in this embodiment is used to attach stud 50 to a corresponding anchor, such as a mounting panel with a threaded nut (shown in FIG. 8), on an automobile. Cap portion 52 is located on one end of stud 50 and is integral to post 51. In this embodiment, cap portion 52 has a plurality of gear-like teeth 38 positioned around its peripheral edge 37.

Still referring to FIG. 4, circular collar 41 is molded over stud 50 so that it is secured to cap portion 52 by means well-known in the art. Thus, while FIG. 4 shows an exploded view of stud assembly 40, such view is only for convenience of discussion, because the stud assembly is actually one piece after the collar 41 is molded over cap portion 52. Collar 41 is made of any type of plastic or other material that can be shear welded to a lamp housing and molded over stud 50 (i.e., "shear weldable material"). As collar 41 is molded over cap portion 52, a recess 45 is formed around and holds cap portion 52 of stud 50. Collar 41 is shaped like a ring and has an inner peripheral surface 42 and an outer peripheral surface 43. Inner peripheral surface 42 forms corresponding gear-like teeth 38 as collar 41 is molded over cap portion 52, so that the collar fits around the cap portion's peripheral edge 37. Collar 41 further has a recessed surface 44 that sits adjacent to the backside of cap portion 52. Recessed surface 44 forms an opening 47 around post 51 of stud 50 as collar 41 is molded over cap portion 52. Thus, post 51 extends through and away from opening 47.

Figure 5:
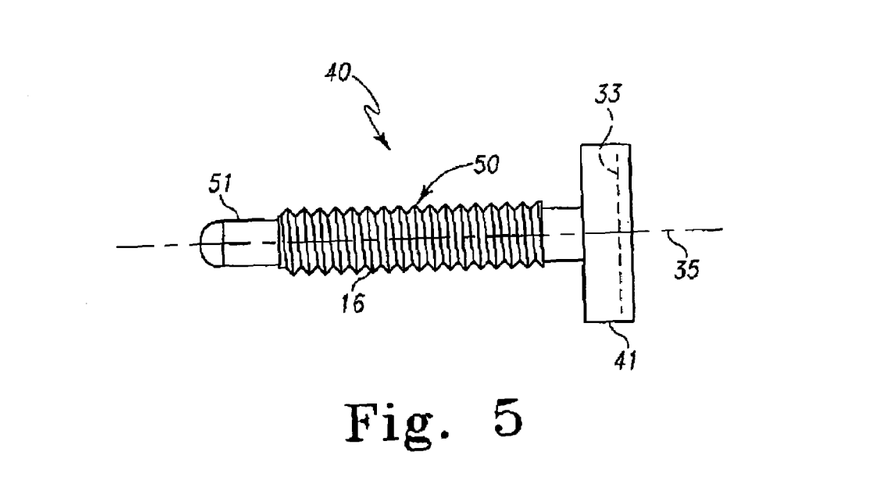
FIG. 5 is a side plan view of the assembled stud and collar assembly of FIG. 4.

When collar 41 is molded over cap portion 52, the cap portion sits in recess 45 and against recessed surface 44 so that the top of the cap portion is seated below the face 46 of the collar. FIG. 5 shows assembly 40 with collar 41 molded over cap portion 52. As can be seen in FIG. 5, top surface of cap portion 52 (indicated by phantom line 33) is positioned below the collar's 41 face 46. As explained in further detail below, collar 41 is used to attach stud 50 to an automotive lamp housing 20 by sonic welding or shear welding collar 41 to a receiving recess 60 on the lamp housing (shown in FIG. 7). As used herein, the terms "sonic welding" and "shear welding" are interchangeable and each refer to a process where the collar and lamp housing are subjected to high-frequency sound waves that vibrate the collar and lamp housing to cause friction and high, focused heat, which will melt or weld the lamp housing and collar together. For convenience sake, only the term shear welding will be used from hereon to describe this welding process.

Figure 6:
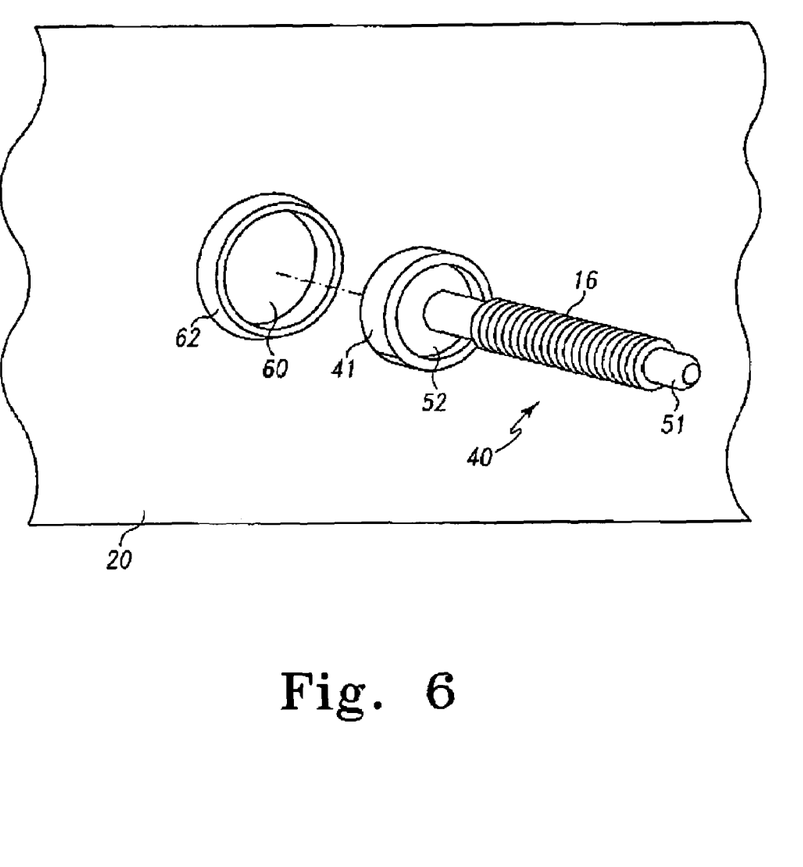
Figure 7:
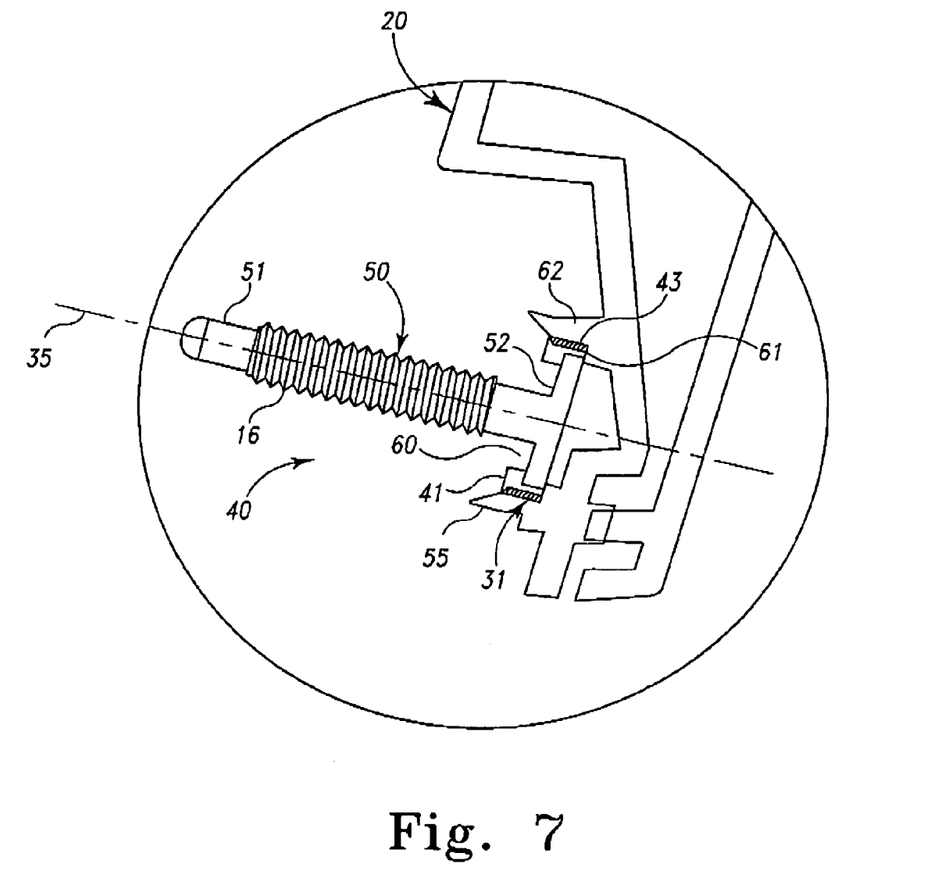
FIG. 7 is a cross-section view of the stud and collar assembly of FIG. 5 welded to the lamp housing.

FIG. 6 shows a rear view of a section of lamp housing 20 with a receiving surface that collar and stud assembly 40 is welded too. As shown in FIG. 6, in this embodiment, the receiving surface comprises a molded, raised rib 62 on lamp housing 20. Raised rib 62 forms a receiving recess 60 that has a diameter that is less than the diameter of collar 41. The top of raised rib 62 comprises an angled lead-in 55 (shown best in FIG. 7) that helps guide collar 41 into the receiving recess during insertion. FIG. 7 shows a cross-section view of the collar and stud assembly 40 welded to lamp housing 20. In order to weld collar 41 to lamp housing 20, a shear welder (not pictured) is used to apply ultrasonic energy to the collar and raised rib 62. As collar 41 and rib 62 melt together stud assembly 40 is driven into receiving recess 60. Once collar and stud assembly 40 is fully inserted into recess 60, collar's 41 face 46 will contact and sit against a seating surface 61 molded on the lamp housing.

Still referring to FIG. 7, during shear welding, peripheral surface 43 will melt together with rib 62 at weld interfaces 31. Weld interface 31 refers to the location where the weld forms as material from both rib 62 and peripheral surface 43 are fused together. While rib 62, in this embodiment, is molded on the back side of and at the same time as lamp housing 20 to form receiving recess 60, receiving recess could be formed on a bracket, or any other like mounting device, that is attached to the lamp housing Typically, for the shear weld between collar 41 and lamp housing 20 to be ideal, collar 41 and lamp housing 20 will comprise the same shear weldable material, such as polypropylene, ABS plastics or any other type of plastic polymer. However, collar 41 and housing 20 may comprise different materials that can be shear welded together, provided that differences in welding characteristics of those materials are taken into consideration.

Figure 8:
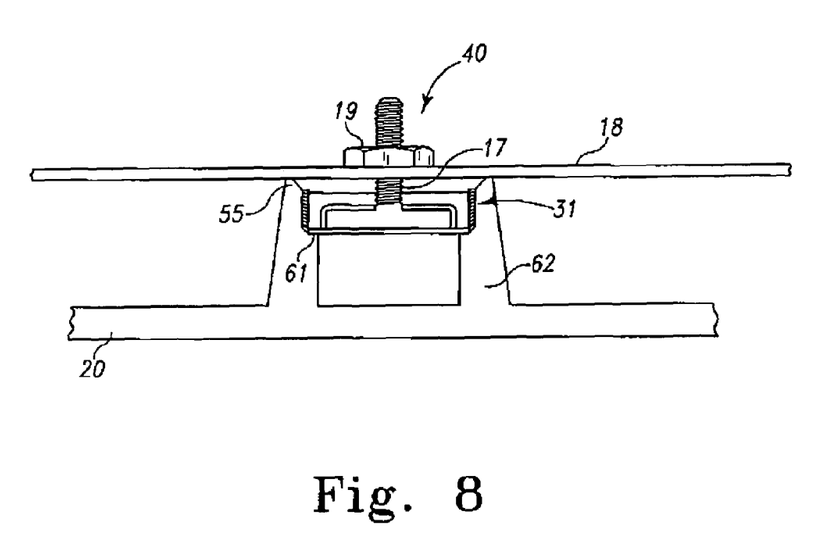
FIG. 8 is a cross-section view of the lamp housing of FIG. 6 attached to a mounting panel of an automobile.

Still referring to FIG. 7, after the shear welding process has taken place, stud 50 is securely retained to lamp housing 20 by collar 41 and stud's threaded portion 16 projects out away from lamp housing 20. In this embodiment, because collar 41 is welded to lamp housing 20, collar 41 will remain stationary and stud 50 will be prevented from rotating about its longitudinal axis 35 by the interaction of cap's gear-like teeth 38 with collar's gear-like teeth 38 (shown in FIG. 4). Thus, in this embodiment, stud 50 can be used to mount lamp housing 20 to an automobile by means well known in the art. FIG. 8 shows a cross-section view of the lamp housing 20 attached to mounting panel 18 of an automobile. As shown in FIG. 8, threaded portion 16 of collar and stud assembly 40 is inserted through opening 17 of mounting panel 18. Nut 19 is then fastened to threaded portion 16 in order to attach assembly 40 and lamp housing 20 to the automobile's mounting panel 18. The shear welding process cuts down on the variation of the lamp housing and mounting panel connection for a particular line of automobiles.

Unlike the spin welded assembly and spin welding process, shear welding does not cause the collar and stud assembly 40 to be driven into the lamp housing. Further, the plate 29 of the mounting panel (shown in FIG. 1) for connecting a two-sided stud is not needed for connecting a shear welded collar and stud assembly to the mounting bracket. In this embodiment, the lamp housing sits directly on the mounting panel to eliminate these sources variation that plague the prior art. Accordingly, the lamp housing sitting on the mounting plate eliminates variation in the lamp housing and automobile connection and enables a more accurate lamp housing and automobile fit during the manufacturing process of automobiles. This reduces gaps and the time and cost needed to fill such gaps. Other benefits of the shear welded design include a stronger weld that prevents connection failure designs because the shear welding of the collar 41 to rib 62 in receiving recess 60 creates a more consistent weld joint between the two. Further, by having a receiving surface on the lamp housing for the shear weld to take place, designers can eliminate any reliance on bosses on the lamp housing that increases manufacturing costs and the likelihood of mold failure.

Figure 9A:
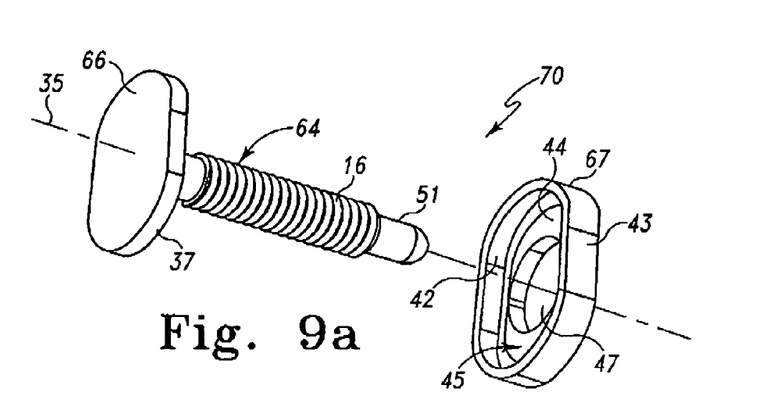
FIG. 9a is an exploded view of another embodiment of the stud and collar assembly.
Figure 9B:
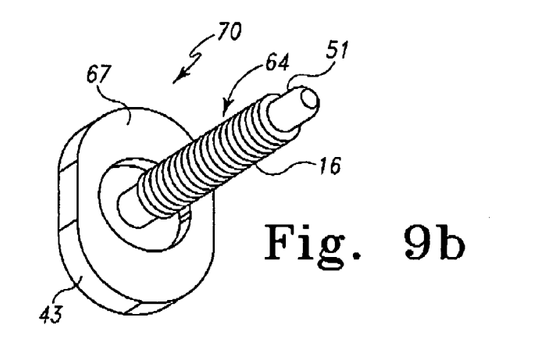
Figure 9C:
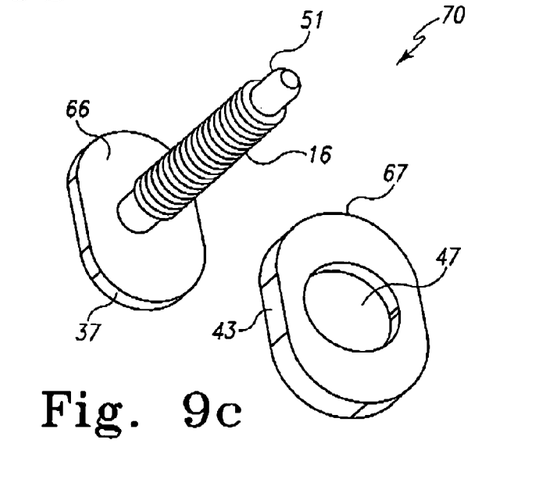

Other embodiments of the collar and lamp assembly exist. For example, FIG. 9a shows an exploded view of another embodiment of the stud and collar assembly 70. FIG. 9b shows a rear perspective view of an assembled stud and collar assembly 70 of this embodiment and FIG. 9c shows a rear perspective view of another embodiment of collar and shaft assembly 70. As shown in these figures, assembly 70 comprises a stud 64. Stud 64 still comprises post 51 with threaded portion 16. However, in this embodiment, stud 64 comprises a different cap portion 66 that is oval in shape and does not have any gear-like teeth located on its peripheral edge 37. Stud and collar assembly 70 also has a different collar 67 that is also oval in shape and dimensioned to receive cap portion 66 of stud 64. Like the previous embodiment, collar 67 has a recess 45. Collar 67 also has recessed surface 44 with opening 47. Collar also has inner peripheral surface 42 and outer peripheral surface 43. Unlike collar 40 of the previous embodiment, collar 67 does not have any gear-like teeth positioned on the collar's inner peripheral surface 41. Collar 67 is molded over cap portion 66 so that the cap portion seats within recess 45 and post 51 extends away from collar 67 through opening 47.

Referring to FIGS. 7 and 8, this embodiment of the stud and collar assembly 70 can be shear welded to lamp housing 20 in the same manner as the previous embodiment by welding peripheral surface 43 to rib 62 so that collar 67 will be driven into receiving recess 60. However, in this embodiment, stud 50 will not be prevented from rotating by the interaction of cap portion's gear-like teeth 38 with the collar's gear like teeth 38 (shown in FIG. 4). Instead, stud 64 will be prevented from rotating about its longitudinal axis 35 by the interaction of cap portion's peripheral edge 37 with collar's inner peripheral surface 41. Thus, it is the oval shape of the cap portion 66 and collar 67, in this embodiment, that prevents stud 50 from rotating and that allows the stud to be used to mount the lamp housing to an automobile in the same manner as the previous embodiment. Thus, it will be appreciated that the collar and the cap can be any shape that prevents rotation, such as a square, a rectangle, or a triangle, so long as the collar and cap can be joined together to form a stud and collar assembly. It is apparent that countless embodiments exist simply by varying the shape of the collar of the stud collar assembly and the receiving surface of the lamp housing 20, and by choosing alternate areas to apply ultrasonic energy. However, in each of the embodiments, at least one surface of the collar is shear welded to at least one surface (termed the receiving recess 60 above for convenience) of lamp housing 20, at a weld interface 31 where the two surfaces are shear welded together.

The embodiments described above demonstrate how a stud can be attached to a lamp housing by shear welding a collar made up of shear weldable material to lamp housing after the lamp housing has been molded. This allows greater flexibility in design, a reduction in molding costs, and the ability to produce thinner lamp housings. Further, these embodiments reduce the variation of the connection of the lamp housing to the automobile in order to provide better lamp housing fits, which in turn eliminates gaps and the time and cost to need to fix those gaps. Moreover, shear welding the peripheral edge of the collar to the lamp housing creates a more consistent weld that prevents failure and allows for a stronger connection to be made to the automobile when the lamp assembly is mounted thereto.

While the subject invention has been described in considerable detail with references to particular embodiment thereof, such is offered by way of non-limiting examples of the invention, as many other versions are possible. For example, while the embodiments have been described relative to being welded to a receiving recess 60 of lamp housing, it will be appreciated that the embodiments can be welded to a bracket positioned on the lamp housing or any other like apparatus. While the subject invention may be used with a variety of different lamp assemblies, it is anticipated that a variety of other modifications and changes will be apparent to those having ordinary skill in the art and that such modifications and changes are intended to be encompassed within the spirit and scope of the pending claims.

What is claimed is:

1. An automotive lamp assembly, comprising:
   a stud and collar assembly including
      a stud,
      a cap located at an end of the stud, and
      a collar disposed on said cap; and
   a lamp housing that is welded to said collar,
      wherein said stud extends about an axis, wherein said cap radially extends from said stud, wherein said cap includes an outer peripheral surface, wherein said collar is defined by an inner peripheral surface that correspondingly-interacts with the outer peripheral surface of said cap to prevent rotation of said stud about the axis, wherein said collar is defined by a weldable outer peripheral surface, and
      wherein said lamp housing is further defined to include a rib that defines a weldable inner peripheral surface, wherein the weldable outer and inner peripheral surfaces cooperate to provide a weld interface that joins said stud and collar assembly to said lamp housing.

2. The assembly according to claim 1, wherein the weld interface is radially-disposed relative the axis.

3. The assembly according to claim 1, wherein the collar comprises polymer, wherein the stud and cap comprise metal, wherein the collar is molded over said cap.

4. The assembly according to claim 1, wherein the outer peripheral surface of the cap includes gear-like teeth that forms corresponding gear-like teeth on said inner peripheral surface.

5. The assembly according to claim 1, wherein the outer peripheral surface of the cap includes a shape that is selected from the group consisting of an oval shape, a square shape, a rectangular shape, and a triangle shape, wherein the outer peripheral surface of the cap forms a corresponding shape of said inner peripheral surface that is selected form the group consisting of an oval shape, a square shape, a rectangular shape, and a triangle shape.

6. The assembly according to claim 1, wherein the cap is further defined to include:
   a top surface, wherein the collar is further defined to include
   a recessed surface, and
   a face surface, wherein the cap is disposed against the recessed surface of the collar and below the face surface of the collar.

7. The assembly according to claim 1, wherein the stud is further defined to include:
   a threaded portion, and
   a post.

8. An automotive lamp assembly, comprising:
a stud and collar assembly including
   a stud extending about an axis,
   a cap radially extending from the stud,
   a collar disposed on said cap, and
   means for preventing rotation of said stud about said axis;
a lamp housing, and
means for welding said collar of said stud and collar assembly to said lamp housing,
wherein the means for welding said collar to said lamp housing is defined by,
an inner peripheral surface of a rib of said lamp housing and an outer peripheral surface of said cap that, when brought into contact with one another and welded, define a weld interface.

9. The assembly according to claim 8, wherein the means for preventing rotation of said stud about said axis is defined by an inner peripheral surface of said collar that correspondingly-interacts with an outer peripheral surface of said cap.

10. The assembly according to claim 9, wherein the collar is molded over said cap, wherein the outer peripheral surface of the cap includes gear-like teeth that forms corresponding gear-like teeth on said inner peripheral surface when said collar is molded over said cap.

11. The assembly according to claim 9, wherein the collar is molded over said cap, wherein the outer peripheral surface of the cap includes a shape that is selected from the group consisting of an oval shape, a square shape, a rectangular shape, and a triangle shape, wherein the outer peripheral surface of the cap forms a corresponding shape on said inner peripheral surface that is selected from the group consisting of an oval shape, a square shape, a rectangular shape, and a triangle shape when said collar is molded over said cap.

12. The assembly according to claim 8, wherein the weld interface is radially-disposed relative the axis.

\* \* \* \* \*